Feb. 22, 1966  W. R. LAWSON  3,236,272
TIMBER RESAW GUIDE BAR POSITONING MEANS
Filed Feb. 6, 1964  2 Sheets-Sheet 1

INVENTOR.
WILLIE R. LAWSON
BY John R. Walker, III
Attorney

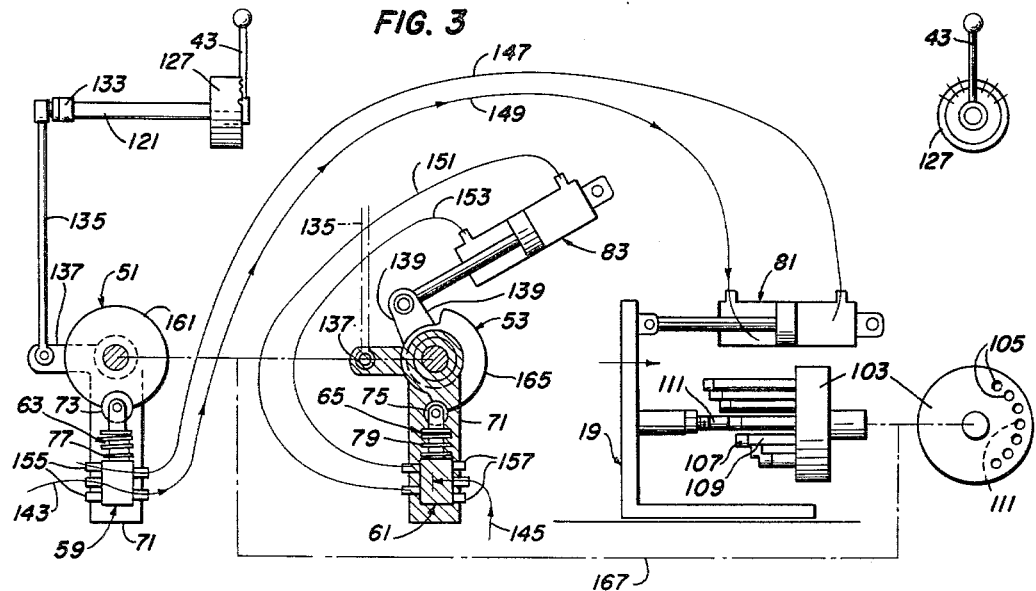
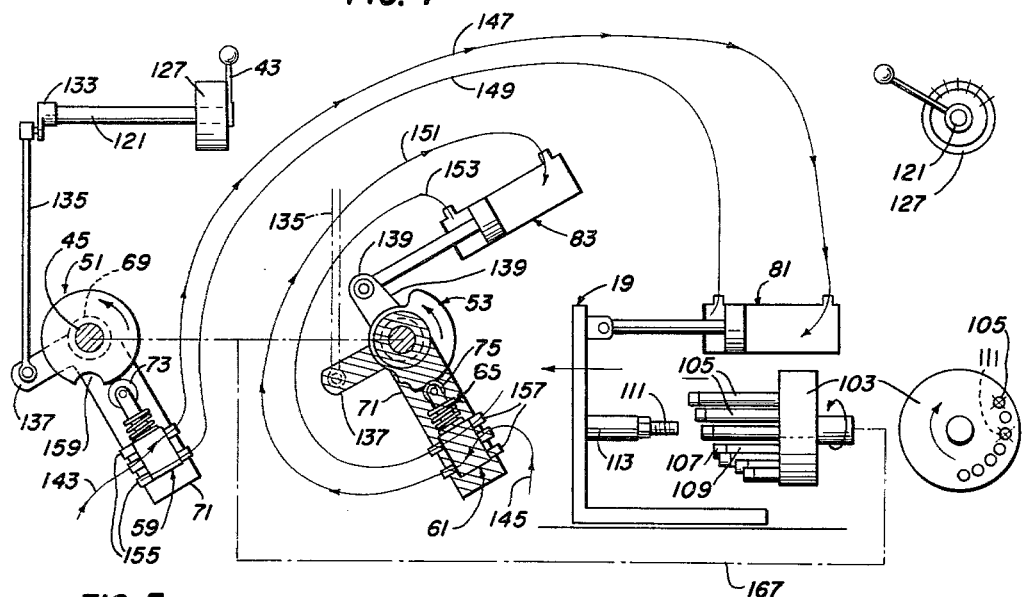
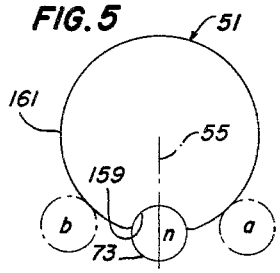
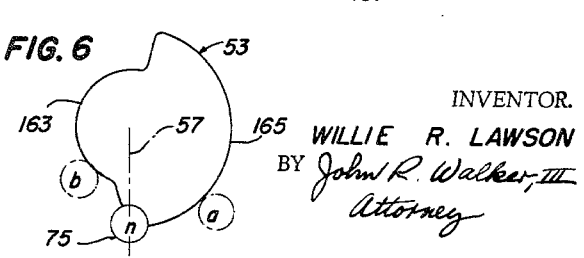

United States Patent Office 3,236,272
Patented Feb. 22, 1966

3,236,272
TIMBER RESAW GUIDE BAR POSITIONING MEANS
Willie R. Lawson, Memphis, Tenn., assignor to National Die & Machine Works, Inc., Memphis, Tenn.
Filed Feb. 6, 1964, Ser. No. 342,986
8 Claims. (Cl. 143—174)

This invention relates generally to woodsawing machines and particularly those machines having positionable saw table gauges or guide bars for guiding the timber being cut into the saw and for determining the thickness of the timber to be cut. The present invention particularly relates to a fluid powered means for selectively positioning the guide bar in a resaw machine.

In resaw machines of prior construction, various means have been employed to adjustably position the gauge or guide bar at certain distances away from the saw. Such mechanical devices as rack and pinion or linked lever mechanisms and electromagnetic braking devices have been used for adjusting the travel or positioning the guide bar. For various reasons, these adjustment means have not always performed properly. Such problems as the devices being slow and cumbersome to operate or being inaccurate or inconsistent in the settings of the guide bar have resulted in wasted time and material.

The present invention does much to overcome such problems as above-mentioned and has as a principal object to provide a positive acting and accurately positionable guide bar adjustment means and such means that positions the guide bar consistently accurately at each guide bar setting.

A further object is to provide rapid acting means whereby the guide bar is quickly positionable.

A further object is to provide a strong and durable guide bar positioning means of such design as to provide long and trouble-free service.

A further object is to provide a guide bar positioning means that is quickly and easily adjusted or changed to an infinite number of settings for cutting boards or the like of an infinite number of thicknesses.

A further object is to provide a relatively simple guide bar positioning means which has only one hand control lever and is easily operable.

A further object is generally to improve the design and construction of means for positioning the guide bar in a timber sawing machine or the like.

The means by which the foregoing and other objects of the present invention are accomplished and the manner of their accomplishment will be readily understood from the following specification upon reference to the accompanying drawings, in which:

FIG. 3 illustrates schematically the action and position of the various elements of the bar positioning means, with the hand control lever and bar positioned at mid-range locations.

FIG. 4 is similar to FIG. 3 and illustrates schematically the action and position of the various elements of the bar positioning means, with the hand control lever moved to a full counterclockwise position and the various components being moved in response to the movement of the hand lever.

FIG. 5 is a schematic showing of one of the cams showing the relationship with its cam follower.

FIG. 6 is a schematic showing of the other of the cams showing the relationship with its cam follower.

Figure 1:
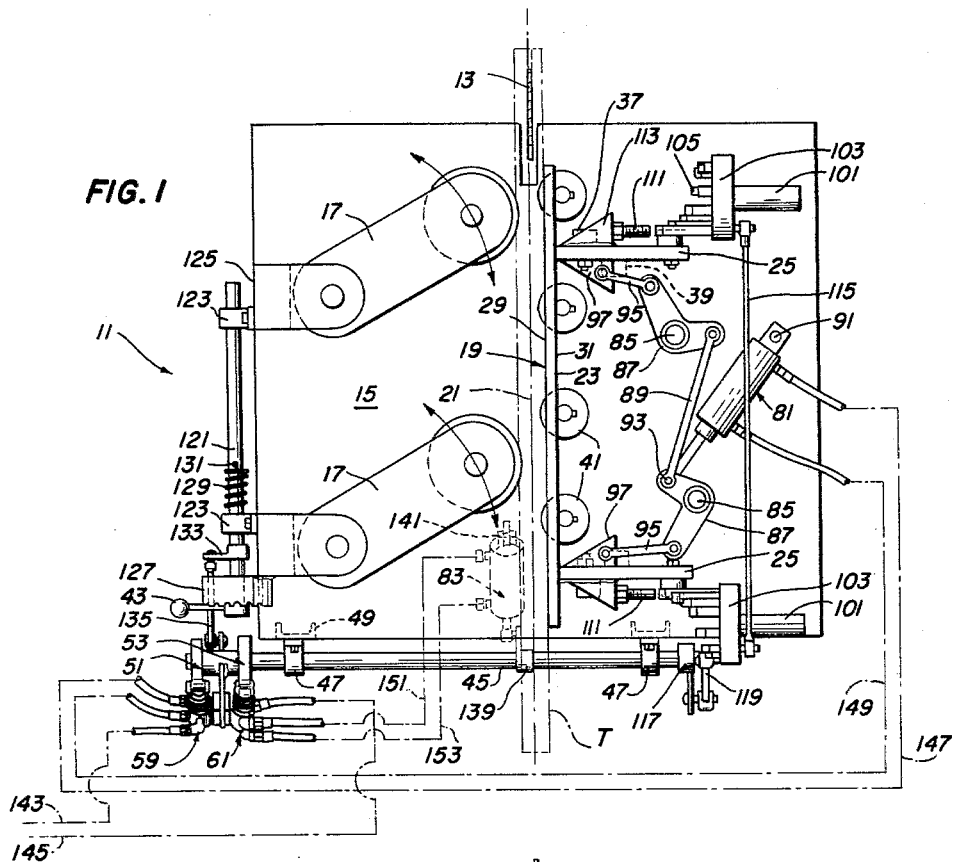
FIG. 1 is a top plan view of the saw table of a band saw type resaw machine and illustrating the table and machine provided with the guide bar positioning means of the present invention.

Referring now to the drawing in which the various parts are indicated by reference characters, the guide bar positioning means of the present invention will be described in combination with a resaw machine indicated as at 11. Machine 11 is of conventional construction relative to the timber sawing and feeding components thereof, and since these components do not comprise the present invention and are well-known to those skilled in the art, they have been omitted in the drawing or have not been shown in detail.

Resaw machine 11 is of the usual band saw type machine and includes a vertically mounted band saw blade, fragmentarily shown and indicated at 13. Band saw blade 13 is mounted and driven by means well-known to those skilled in the art. The conventional saw table, generally indicated at 15, is fixed to and horizontally mounted in the usual way from the band saw mounting means. The timber being cut is fed through the resaw by a pair of upstanding power-driven feed roller devices 17 which are operably swingable inwardly and outwardly to feedably engage a workpiece of timber, as timber T indicated in broken lines in FIG. 1.

The guide bar, indicated at 19, is mounted on table 13 and is linearly movable toward and away from an imaginary saw line 21 that is in the plane of the cutting portions of saw blade 13, and which is indicated in broken lines in FIG. 1. Guide bar 19 includes generally a substantially flat main body member 23 and a pair of support members 25. Main body member 23 is preferably of substantially flat metal plate material and extends substantially the length of saw table 15. Main body member 23 extends uprightly from upper surface 27 of saw table 15 and includes an inward side surface 29 and an outward side surface 31. The pair of support members 25 are disposed respectively at the opposite ends of main body member 23 and support guide bar 19. Each of support members 25 is somewhat triangular-shaped and is affixed vertically and laterally perpendicular to main body member 23 on outward side surface 31.

Guide bar 19 is supported for linear movement on table 15 in the following manner: A pair of spaced and parallel slotted apertures 33 are provided through saw table 15 respectively under each of support members 25. Depending portions 35 respectively of each of support members 25 project downwardly therefrom and extend respectively through slotted apertures 33. Three rollers 37, 39 are provided on each support member 25 and guidingly support guide bar 19. Each support member 25 includes two upper rollers 37 and a lower roller 39 rollingly engaging respectively the upper and lower surfaces of table 15.

Four upstanding idler rollers 41 are preferably provided and are journaled at strategic locations along main body member 23 of guide bar 19. Idler rollers 41 are journaled on the outward side 31 of main body member 23, are rotatable respectively in slots, not shown, in member 23, and project slightly inwardly from the inward side 29 of body member 23. Idler rollers 41 rollingly engage the timber as it is being sawed and facilitates a more accurate cutting of the wood.

Means are provided whereby the operator of the resaw machine may accurately position guide bar 19 by the manipulation of a hand lever 43. Such means is preferably pneumatically powered and will be described thus in the specification; however, other means such as hydraulic power may be employed without departing from the spirit and scope of the present invention.

A shaft 45 is subjacently mounted along the front edge portion of table 15. Shaft 45 is journaled in bearings 47 and is mounted on brackets 49 depending from table 15. An end portion of shaft 45 extends outwardly from table 15 and is provided with a first cam 51 and a second cam 53. Cams 51, 53 are spaced somewhat apart, are fixedly attached to shaft 45, and are rotatable therewith. Cams 51, 53 are of different peripheral configurations or profiles, as best seen in FIGS. 5 and 6. For descriptive purposes, each cam will be considered as having a 0 degree division, which is indicated by broken lines 55, 57, respectively, for cams 51, 53. Cams 51, 53 are fixed to shaft 45 with the respective 0 degree division lines in longitudinal alignment with the shaft.

A first valve 59 and a second valve 61 co-act respectively with first and second cams 51, 53 through respective cam followers 63, 65. Valves 59, 61 are co-axially mounted with first and second cams 51, 53 and are movable about the respective cams. A pivotal support bracket 67 preferably mounts valves 59, 61 rotatably about cams 51, 53. Bracket 67 preferably includes a tubular member 69 pivotally received on shaft 45 and disposed between first and second cams 51, 53, respectively, and a support plate member 71 centered on tubular member 69 and perpendicularly extending therefrom.

First and second valves 59, 61 are preferably of the sliding piston type and are operable by the reciprocative motion of the respective cam followers 63, 65. Cam followers 63, 65 respectively include the usual cam rollers 73, 75 connected respectively to the valve pistons of the respective valves 59, 61. Compression springs 77, 79 are respectively carried around the plungers of valves 59, 61 and yieldably urge the respective rollers 73, 75 in contact with the respective cams 51, 53 and actuate the respective valve plungers in one direction of movement.

First and second piston and cylinder assemblies 81, 83 are provided and respectively are actuated by first and second cams 51, 53 and first and second valves 59, 61. The piston and cylinder assemblies 81, 83 are of the double-acting type, and thus first and second valves 59, 61 each have five port openings in the respective bodies thereof; that is, each valve body has one inlet, two outlets, and two exhaust ports, as best seen in FIGS. 3 and 4.

A first fluid operable drive means including piston and cylinder assembly 81 is mounted on saw table 15 and on the outward side of guide bar 19. First fluid operable drive means is for the actuation of guide bar 19 inwardly and outwardly or toward and away from saw line 21. The mechanism for actuating guide bar 19 may suitably be of various constructions; however, such mechanism preferably is as follows: A pair of spaced upright pivot pins 85 are fixedly attached perpendicularly from the upper surface 27 of table 15. A pair of bell-crank levers 87 are pivotally mounted on pivot pins 85. Bell-crank levers 87 each include a short arm and a long arm, and the respective mounting of each lever is such that the short arm of one lever projects inwardly and the short arm of the other lever projects outwardly. A connecting rod 89 pivotally connected at the opposite ends thereof respectively to the end portions of the short arms of the bell-crank levers 87 synchronizes the movement of one bell-crank lever relative to the other.

Piston and cylinder assembly 81 is pivotally mounted at the base end portion thereof to a mounting pin 91 fixed to and upstanding from table 15. The piston rod of assembly 81 is pivotally attached to pin 93 of connecting rod 89. A pair of connecting links 95 respectively connect the ends of the long arms of bell-crank levers 87 to guide bar 19. The opposite ends of links 95 are respectively pivotally attached to the long arms of bell-crank levers 87 and to guide bar 19. Triangular-shaped anchor blocks 97, attached respectively horizontally along the inside surface of support member 25, preferably provide means for mounting the pivots of the connecting links 95. It will thus be seen that, with actuation of piston-cylinder assembly 81 and movement of the piston rod thereof, the drive mechanism will actuate guide bar 19 inwardly and outwardly along the top of saw table 15.

Figure 2:
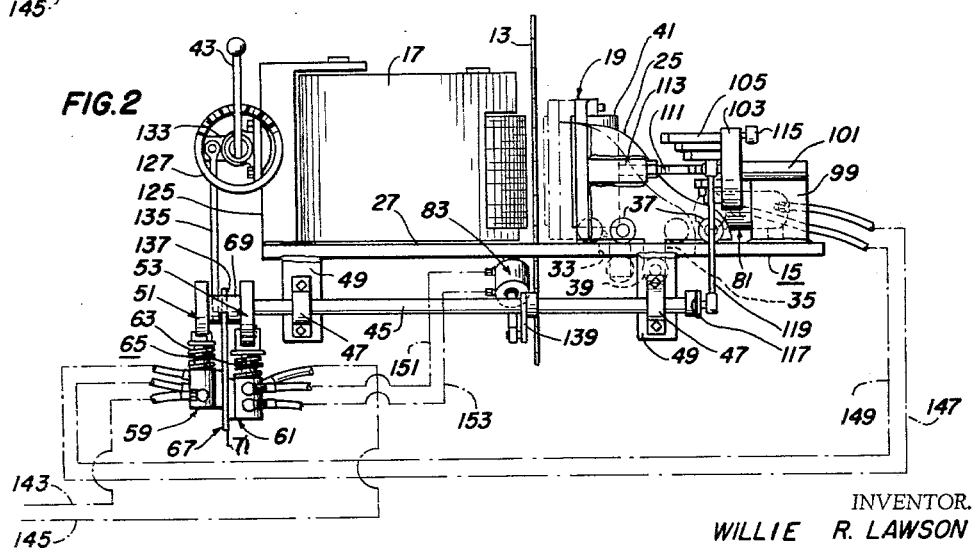
FIG. 2 is a front elevational view of the saw table and guide bar positioning means.

Stop mechanism is provided for limiting the outward movement and positioning of guide bar 19. Such stop mechanism preferably includes two mechanisms which are substantially alike, and the description of one of these mechanisms follows: An upstanding base plate 99 is fixed to the upper surface 27 of saw table 15, as best seen in FIG. 2. An axle 101 is fixedly attached to the top portion of base plate 99, having the axis thereof extending substantially perpendicular to the main body member 23 of guide bar 19 and substantially parallel with the inward and outward direction of movement of the guide bar. Axle 101 includes an end portion which projects somewhat inwardly of base plate 99, and on this end portion is journaled a wheel 103. A plurality of stop members 105 extend perpendicularly and laterally from that side of wheel 103 which faces guide bar 19. Each of stop members 105 includes a bolt-like element 107 and a tubular spacer element 109. Each bolt element 107 extends through a spacer element 109 and is threadedly attached to wheel 103. Stop members 105 are each disposed equidistantly from the center axis of wheel 103 and are equiangularly arranged circumferentially around a portion of wheel 103. Stop members 105 are of different lengths and may be of any suitable number. It has been found that seven stop members have been a practical number for use in most applications, and this number has been illustrated and is described in this specification. A master stop member 111, in the form of a stud and nut, is adjustably mounted from guide bar 19. A triangular-shaped mounting block 113, similar to an anchor block 97, is horizontally and fixedly attached to a support member 25. Mounting block 113 is disposed substantially oppositely of an anchor block 97 and threadedly receives a master stop member 111. The above is a description of one of the stop mechanisms, and thus it will be seen that, with rotation of wheel 103 and with the engagement of one of the seven stop members 105 with a master stop member 111, seven different positions of guide bar 19 from saw line 21 may be obtained.

The two stop mechanisms are connected by a connecting rod 115, as best seen in FIG. 1. Connecting rod 115 is pivoted at the opposite ends thereof to wheels 103 and in such a way that the two wheels 103 of the stop mechanisms are moved together at the same rate. With reference to FIG. 1, it will be noted that wheels 103 are each disposed outwardly from a respective support member 25 of guide bar 19, and the respective master stop member 111 of each stop mechanism is disposed inwardly relative to the axis of each wheel 103. Since wheels 103 move together and always in the same direction, it is apparent that the placement of stop members 105 will be such that stop members 105 of equal length are in register with and engage a respective master stop member 111.

An arm 117 is fixed to shaft 45 at that end thereof remote from first and second cams 51, 53. A linking rod 119 is pivotally attached at the respective opposite ends thereof to arm 117 and the adjacent one of wheels 103. Turning shaft 45 thus transmits movement through arm 117 and rod 119 to the respective stop mechanisms and turnably positions the stop members.

Manually settable control means is provided and includes hand lever 43. The control means comprises mechanism that is effective for turnably positioning support bracket 67 and first and second valves 59, 61. The control means preferably is as follows: A shaft 121 is journaled in bearings 123 which are attached to upright supports 125 of feed rolls 117. Hand lever 43 is fixed perpendicular to the forward end of shaft 121, and a notched ring 127, fixed to the forward one of upright supports 125, settably engages hand lever 43. Shaft 121 and lever 43 are axially slidable, and lever 43 is yieldably held in a selected notch setting by a compression spring 129 on shaft 121 and a pin 131 extending therethrough, as best seen in FIG. 1. The number of notches in ring 127 is the same as the number of stop members 105 in each of the stop mechanisms, and thus the number of positions for guide bar 19. The control means additionally includes an arm 133 mounted on shaft 121 and a control rod 135 pivotally connected at the respective ends thereof to arm 133 and a crank member 137 of support bracket 67, as best seen in FIGS. 3 and 4.

A second drive mechanism is provided operably communicating with and responsive to second valve 61. This drive mechanism comprises principally the second piston and cylinder assembly 83 and a crank arm 139. The base end of the cylinder of assembly 83 is articulatingly secured to the undersurface of table 15 by a suitable bracket and pin 141, as indicated in FIG. 1. Crank arm 139 is fixedly mounted on shaft 45 intermediate the length thereof. The piston rod of assembly 83 is pivotally connected to the end of arm 139. It will thus be seen that assembly 83, upon pneumatic actuation thereof, will turnably move shaft 45 and cams 51, 53 and also move stop wheels 103 to actuate the stop mechanism of the guide bar.

Compressed air power means from a suitable source actuates the guide bar positioning means of the present invention and is communicated respectively to the inlet ports of valves 59, 61 by main conduits 143, 145. First valve 59 and piston-cylinder assembly 81 are connected by conduits 147, 149 which communicate respectively the outlet ports of valve 59 with the oppositely disposed end ports of the cylinder of assembly 81. Likewise, second valve 61 and piston-cylinder assembly 83 are connected by conduits 151, 153 which communicate respectively the outlet ports of valve 61 with the oppositely disposed end ports of the cylinder of assembly 83. Valves 59, 61 preferably each include two exhaust ports 155, 157, respectively. The exhaust ports of the respective valves are not provided with conduits, as are the respective inlet and outlet ports, but open into the atmosphere. It is, of course, well-known to those skilled in the art that certain valves of similar types have only one exhaust port in the valve body, but for clarification the valves of the present invention in the specification are shown and described as having two exhaust ports in each valve.

It should be noted that preferably the arrangement or disposition of the various parts will be such that, with hand lever 43 set in the middle notch or central position, arm 133 and crank member 137 of the hand control means will extend horizontally, and the plate member 71 of support brack 67 and the valves supported thereby will be disposed substantially vertically, as best seen in FIGS. 2 and 3. Moreover, it will be noted that with hand lever 43 in a central position, the middle one of each of stop members 105 of the respective stop mechanisms will be in register with the respective master stop members 111.

In general, the operation of the guide bar positioning means is such that when hand lever 43 is moved from one notch setting to another, a sequential series of operative actions take place. In the first action, guide bar 19, along with the respective stop members 111, moves inwardly and toward saw line 21. In the second action, and while the bar is moved, or is moving inwardly, the wheels 103 of the respective stop mechanisms move the desired ones of stop members 105 in alignment or in register with the master stop members 111 of the guide bar. Then, in the third action, the guide bar is moved outwardly, and the respective master stop members 111 abuttingly engage respectively the selected stop members 105, and the guide bar is positioned.

Valve 59 governs the guide bar movement and action of the cylinder 81 and is a two-position valve having no neutral position. Cam 51, which actuates valve 59, is thus a two-position cam, as may be seen in FIG. 5. Thus, when cam follower roller 73 is in recess 159 of cam 51, valve 59 will be in one position, and when roller 73 is out of the recess and along the peripheral surface 161, valve 59 will be in the other position. Valve 59 is operatively in one or the other position. When valve 59 is positioned with roller 73 in the cam recess 159, or in the normal position, compressed air from the main conduit 143 will be directed by valve 59 through conduit 149 and into the port at the cap end of cylinder 81 and will urge guide bar 19 outwardly and against the respective stop members of the stop mechanisms. This is best seen in FIG. 3. Thus, normally there is always pressure in cylinder 81 holding the master stop member 111 in positive abutting engagement with the selected stop member 105. When valve 59 is in a position other than normal, and that position as shown in FIG. 4, the compressed air will be directed through conduit 147 and into cylinder 81 at the base end thereof, and will urge guide bar 19 away from the stop mechanisms. It will be understood that the actions just described, relative to the arrangement or position of the cam and valve as shown in FIG. 4, are momentary actions, and in operation the relative arrangement of cam 51 and valve 59 and the associated elements thereof will be in the normal position as shown in FIG. 3.

It will, of course, be understood that in both valves 59, 61, when an outlet port of a valve is opened and compressed air is directed through that port and towards a cylinder, the other outlet port will be open or in register with an exhaust port of the valve, and air returning from the cylinder and that air which is in front of the piston will be allowed to escape into the atmosphere and be exhausted. This is the function of both the valves, when either valve is positioned so as to direct air through either one of the inlet ports or to either side of a piston of a piston-cylinder assembly.

The second cam 53 and second valve 61 govern the turning movement of shaft 45 and thus respectively the movement of both the cams and the stop mechanisms. Valve 61 is a three-position valve, and thus the co-acting cam 53 is a three-position cam. FIG. 6 shows a profile view of cam 53 and illustrates schematically three positions of cam follower roller 75 and valve 61, which are designated "n" for the middle or normal position, "b" for that position of the cam roller 75 on the base or inner lobe 163 of the cam 53, and "a" for the position when roller 75 is in engagement with the outer lobe 165.

When cam 53 and valve 61 are positioned in the middle or "n" position, the valve is in neutral, and the compressed air in conduit 145 will not enter either of the conduits 151, 153. When the cam and valve are positioned as shown in FIG. 4, and the "a" position as shown in FIG. 6, valve 61 will be in such a position as to direct air through conduit 151 and into the port at the base end of the cylinder 83. When cam 53 and valve 61 are arranged in the "b" position, as shown in FIG. 6, valve 61 will direct air through conduit 153 and into the cap end of cylinder 83. Referring to FIGS. 3 and 4, it will be noted that whether the valve and cam are in an "a" or a "b" position, the resultant action is to return the cam and valve to an "n" position. Thus, it is apparent that with the valve and cam in the "a" position, as shown in FIG. 4, the compressed air will be directed into the base end of the cylinder 83 to move the piston rod outwardly and to turn arm 139 and cam 53 in a counterclockwise direction. The cam turned counterclockwise relative to the valve will bring the cam and valve into a neutral position to shut off the air and prevent further movement.

When cam 53 and valve 61 are in a "b" position, the air will enter conduit 153 and the cap end of the cylinder 83 and will move arm 139 and cam 53 in a clockwise direction until such movement is stopped with the valve in a neutral position. It will thus be seen that the function of cam 53, valve 61, and the cylinder 83 upon movement of hand lever 43 is always to restore or return the apparatus to a neutral position and to return the 0 degree division indicated at 57 to a centered position relative to cam roller 75 and valve 61. It will be understood that such neutral-restoring function of cam 53, valve 61, and cylinder 83 serves also as a booster function for shaft 45 and the respective stop mechanisms and will tend to position the shaft and the respective elements to a selected position under pneumatic power means.

The above has described somewhat separately the actions of cam 51, valve 59, cylinder 81, and their associated elements on one hand, and cam 53, valve 61, cylinder 83, and their associated elements on the other hand. Such separate descriptions are primarily for purposes of clarity; for, as it may be readily seen, valves 59, 61 are mounted respectively from opposite sides of support member 71, and thus the respective actions of each occur somewhat simultaneously.

By way of example, and to describe the cooperative functions of the first and second valves 59, 61 and the respective associated elements of each, the following is offered: Assume that the operator of the machine has just moved lever 43 counterclockwise from a central setting, as shown in FIGS. 2 and 3, to a setting as shown in FIG. 4. When this is done, the manual control means of the apparatus, working through such means including arm 133, control rod 135, and crank member 137, will simultaneously turn valves 59, 61 respectively around cams 51, 53, and the positioning apparatus will be substantially arranged as illustrated in FIG. 4 and in the "a" positions illustrated in FIGS. 5 and 6. With the apparatus thus positioned, the guide bar 19 is moved away from the stop mechanisms in response to valve 59, and wheels 103 of the stop mechanisms are moved clockwise through the drive means heretofore described and indicated schematically at 167 in FIG. 4, in response to valve 61. It will, of course, be understood that some delay momentarily occurs between the resultant operative function of valve 59 and the resultant operative function of valve 61; that is, sufficient time elapses between the movement of guide bar 19 and the movement of the stop mechanisms to permit the respective master stop members 111 to sufficiently clear the respective stop members 105. Cams 51, 53 will continue to be driven in a counterclockwise direction under the influence of valve 61 and the cylinder 83, until both cam rollers 73, 75 simultaneously return to the 0 degree division of each cam; and cam roller 73 will be in recess 159 and cam roller 75 will be in a neutral position.

It will be understood that the respective linkage or the arrangement of the various components of the positioning apparatus is such that, selectively, the certain ones of stop members 105 of the respective stop mechanisms will move to positions in register respectively with master stop members 111, and which position of each stop member 105 is responsive to and corresponds with the notch setting of hand lever 43. Thus, as seen in FIG. 4, in the lower right-hand profile view of wheel 103, the wheel is turning to a position corresponding to the setting of lever 43, and which setting is shown schematically in the upper right-hand view of FIG. 4. Referring to the lower right-hand profile showing of wheel 103, it will be understood that the wheel will not move until the stop member 105, indicated with a solid line cross, is in register with the master stop member 111 of guide bar 19, indicated with a broken line cross.

When cam 53 is moved until it is in a neutral and stopped position, cam 51 will simultaneously be moved until cam follower roller 73 is received in recess 159. Cam roller 73, as it is received in recess 159, re-positions valve 59 to that position which reverses the direction of movement of the piston rod of assembly 81, and causes guide bar 19 to be moved outwardly and the respective stop members to be abuttingly engaged.

Should it be desired to cut a board thickness other than the seven pneumatically settable positions, one or more pairs of stop members 105 may be changed to stop the outward travel of guide bar 19 at a desired position or positions. The bolt-like elements 107 and the spacer elements 109 of stop members 105 preferably are paired so that by combining selected ones of the bolt and spacer elements 107, 109, various length stop members 105 may be obtained. Should it be desired to change by the same amount all the stop positions of the guide bar, the pair of master stop members 111 may be threadedly adjusted respectively in mounting blocks 113 of the guide bar. Thus, by the manipulation of stop members 105 and master stop members 111, the guide bar positioning means of the present invention is quickly and easily fixedly adjusted or changed to an infinite number of settings for cutting boards of an infinite number of thicknesses.

From the foregoing, it is readily seen that the present invention provides a very practical means for positioning a resaw guide bar, and such means as to quickly and accurately position the guide bar with each setting. Also, it will be understood that each individual setting will consistently give the same thickness of board since there is a positive metal-to-metal stop when the master stop member 111 engages the selected stop member 105. Moreover, the guide bar positioning means of the present invention is of such design and construction as to be easy to operate, and to provide long and trouble-free service.

Although the present invention has ben described and illustrated with respect to a preferred embodiment thereof, it is to be understood that it is not to be so limited since changes and modifications may be made therein which are within the full intended scope of this invention as hereinafter claimed.

I claim:

1. In a timber sawing machine or the like having a frame and an outwardly and inwardly movable and positionable guide bar for guiding the timber being cut and for determining the thickness of the timber to be cut, the means for selectively positioning said guide bar comprising operably variable stop means movable to a plurality of stop positions for limiting the outward movement of said guide bar at various positions, manually settable control means movable to a plurality of given positions corresponding to said stop positions, means including fluid actuated means responsive to movement of said control means from one of said given positions to another one of said given positions for moving said guide bar inwardly and for moving said stop means from one of said stop positions to another one of said stop positions corresponding to said another one of said given positions and for subsequently moving said guide bar outwardly until limited in movement by said stop means.

2. In a timber sawing machine or the like having a frame and an outwardly and inwardly movable and positionable guide bar for guiding the timber being cut and for determining the thickness of the timber to be cut, the means for selectively positioning said guide bar comprising operably variable stop means including a master stop member relatively fixedly mounted from said guide bar for movement therewith and a plurality of stop members of various lengths, means movably mounting said plurality of stop members for movement thereof into a plurality of stop positions respectively in alignment with said master stop member and for contact therewith to limit the outward movement of said guide bar at various positions, manually settable control means movable to a plurality of given positions corresponding to said stop positions, means including fluid actuated means responsive to movement of said control means from one of said given positions to another one of said given positions for moving said guide bar inwardly and for moving said stop members from one of said stop positions to another one of said stop positions corresponding to said another one of said given positions and for subsequently moving said guide bar outwardly until limited in movement by said stop means.

3. In a timber sawing machine or the like having a frame and an outwardly and inwardly movable and positionable guide bar for guiding the timber being cut and for determining the thickness of the timber to be cut, the means for selectively positioning said guide bar comprising a first cam and a second cam fixedly joined relative to one another and rotatably journaled from said frame, a first valve, a second valve, support means turnably supporting said first and second valves co-axially with said first and second cams with said first and second valves respectively operably engaging said first and second cams, pressured fluid power means communicating with said first and second valves, first fluid operable drive means connected with and responsive to said first valve and coupled to said guide bar for moving said guide bar outwardly and inwardly, operably variable stop mechanism for limiting the outward movement of said guide bar at various positions, manually settable control means connected with said support means, and second fluid operable drive means interconnecting said first valve and said variable stop mechanism for positioning said stop mechanism correspondingly with the manual setting of said control means.

4. The machine of claim 3 in which said first fluid operable drive means includes a pair of bell-crank levers pivotally mounted from said frame for pivot about vertical axes, each of said levers including a short arm and a long arm, a connecting rod pivotally connected at the opposite ends thereof respectively to said short arms of said levers, means respectively coupling said long arms of said levers to said guide bar, piston-cylinder assembly means pivotally coupled adjacent one end to said frame and pivotally coupled adjacent the opposite end thereof to one of said short arms for pivoting said levers to move said guide bar.

5. In a timber sawing machine or the like having a frame and an outwardly and inwardly movable and positionable guide bar for guiding the timber being cut and for determining the thickness of the timber to be cut, the means for selectively positioning said guide bar comprising a first cam and a second cam fixedly joined relative to one another and rotatably journaled from said frame, a first valve, a second valve, support means turnably supporting said first and second valves co-axially with and for movement about said first and second cams with said first and second valves respectively operably engaging said first and second cams, pressured fluid power means communicating with said first and second valves, first fluid operable drive means connected with and responsive to said first valve for moving said guide bar outwardly and inwardly; operably variable stop mechanism for limiting the outward movement of said guide bar comprising a wheel fixedly journaled from said frame on an axis extending substantially parallel with the path of movement of said guide bar, a plurality of circumferentially spaced stop members of various lengths projecting laterally from that side of said wheel facing said guide bar, and a stop member projecting from said guide bar toward said wheel; said stop mechanism being operably adapted to positionably limit the outward movement of said guide bar by rotation of said wheel to a certain number of positions and to bring one of said plurality of stop members in register with said stop member of said guide bar, manually settable control means connected with said support means, said control means being settable in a like number of positions as said certain number of positions of said wheel of said stop mechanism, and second fluid operable drive means interconnecting said second valve and said variable stop mechanism for rotatably positioning said wheel of said stop mechanism to correspond with a selected setting of said control means.

6. In a timber sawing machine or the like having a frame and an outwardly and inwardly movable and positionable guide bar for guiding the timber being cut and for determining the thickness of the timber to be cut, the means for selectively positioning said guide bar comprising first valve means, second valve means, pressured fluid power means communicating with said first and second valve means, first fluid operable drive means connected with and responsive to said first valve means for moving said guide bar outwardly and inwardly; operably variable stop mechanism for limiting the outward movement of said guide bar comprising a wheel fixedly journaled from said frame on an axis extending substantially parallel with the path of movement of said guide bar, a plurality of circumferentially spaced stop members of various lengths projecting laterally from that side of said wheel facing said guide bar, and a stop member projecting from said guide bar toward said wheel; said stop mechanism being operably adapted to positionably limit the outward movement of said guide bar by rotation of said wheel to a certain number of positions and to bring one of said plurality of stop members in register with said stop member of said guide bar, manually settable control means operably connected with said first and second valve means, said control means being settable in a like number of positions as said certain number of positions of said wheel of said stop mechanism, and second fluid operable drive means interconnecting said second valve means and said variable stop mechanism for rotatably positioning said wheel of said stop mechanism to correspond with a selected setting of said control means.

7. In a timber sawing machine or the like having a frame and an outwardly and inwardly movable and variably positionable guide bar for guiding the timber being cut and for determining the thickness of the timber to cut, the means for selectively positioning said guide bar comprising a first cam and a second cam fixedly joined relative to one another and rotatably journaled from said frame, a first valve, a second valve, support means turnably supporting said first and second valves co-axially with said first and second cams with said first and second valves respectively operably engaging said first and second cams, pressured fluid power means communicating with said first and second valves, a first fluid operable cylinder communicating with and responsive to said first valve for moving said guide bar outwardly and inwardly; stop mechanism for limiting the outward movement of said guide bar at various positions comprising a wheel fixedly journaled from said frame on an axis extending substantially parallel with the path of movement of said guide bar, a plurality of stop members of various lengths projecting laterally from that side of said wheel facing said guide bar, and a stop member projecting from said guide bar toward said wheel; said stop mechanism being operably adapted to limit the outward movement of said guide bar by rotation of said wheel to a certain number of positions, manually settable control means connected with said support means with said control means being settable in a like number of positions as said certain number of positions of said wheel of said stop mechanism, and a second fluid operable cylinder communicating with and responsive to said second valve, said second cylinder being operably connected with and adapted to turnably move said first and second cams and said wheel of said stop mechanism and to rotatably position said wheel of said stop mechanism to correspond with a selected setting of said control means.

8. In a timber sawing machine or the like having a frame an outwardly and inwardly movable and laterally positionable guide bar for guiding the timber being cut and for determining the thickness of the timber to be cut, the means for selectively positioning said guide bar comprising a first cam and a second cam fixedly joined relative to one another and rotatably journaled from said frame, a first valve, a second valve, support means turnably supporting said first and second valves co-axially with said first and second cams with said first and second valves respectively operably engaging said first and second cams, pressured fluid power means communicating with said first and second valves, a first fluid operable cylinder communicating with and responsive to said first valve for moving said guide bar outwardly and inwardly; the operation of said first cylinder being such that normally said guide bar is urged outwardly, but when said support means is turned clockwise or counterclockwise relative to said first cam, said first valve is operable to actuate said first cylinder and to urge said guide bar inwardly; stop mechanism for limiting the outward movement of said guide bar at various positions comprising a wheel fixedly journaled from said frame on an axis extending substantially parallel with the path of movement of said guide bar, a plurality of stop members of various lengths projecting laterally from that side of said wheel facing said guide bar, and a stop member projecting from said guide bar toward said wheel; said stop mechanism being operably adapted to limit the outward movement of said guide bar by rotation of said wheel to a certain number of positions, manually settable control means connected with said support means with said control means being settable in a like number of positions as said certain number of positions of said wheel of said stop mechanism, and a second fluid operable cylinder communicating with and responsive to said second valve, said second cylinder being operably connected with and adapted to turnably move said first and second cams and said wheel of said stop mechanism and to rotatably position said wheel of said stop mechanism to correspond with a selected setting of said control means; the operation of said second cylinder being such that normally there is no movement of said first and second cams and said wheel, but when said support means is turned in a clockwise direction, said first and second cams and said wheel are turned respectively in one direction, and when said support means is turned in a counterclockwise direction, said first and second cams and said wheel are turned respectively in a direction opposite from said one direction of said first and second cams and said wheel.

References Cited by the Examiner
UNITED STATES PATENTS
No references cited.

WILLIAM W. DYER, Jr., *Primary Examiner.*

W. D. BRAY, *Assistant Examiner.*